United States Patent
Sreenivasan et al.

(10) Patent No.: US 11,178,230 B1
(45) Date of Patent: Nov. 16, 2021

(54) DYNAMICALLY MANAGING KEEPALIVE STATUS FOR CLIENT-SERVER CONNECTIONS

(71) Applicant: VMWARE, INC., Palo Alto, CA (US)

(72) Inventors: Rajagopal Sreenivasan, Bangalore (IN); Varun Lakkur Ambaji Rao, Bangalore (IN); Hiral Mehta, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/099,890

(22) Filed: Nov. 17, 2020

(30) Foreign Application Priority Data

Oct. 1, 2020 (IN) .............................. 202041042763

(51) Int. Cl.
*H04L 29/08* (2006.01)
*H04L 29/06* (2006.01)

(52) U.S. Cl.
CPC ........ *H04L 67/145* (2013.01); *H04L 67/1023* (2013.01); *H04L 67/2804* (2013.01); *H04L 67/42* (2013.01)

(58) Field of Classification Search
CPC ............................ H04L 67/143–67/145; H04L 67/1004–67/1023; H04L 67/28–67/2804; H04L 67/42
See application file for complete search history.

(56) References Cited

U.S. PATENT DOCUMENTS

| | | | | |
|---|---|---|---|---|
| 2002/0010783 A1* | 1/2002 | Primak | ................... | G06F 9/505 709/228 |
| 2015/0023161 A1* | 1/2015 | Alisawi | ............... | H04L 67/2833 370/230 |
| 2015/0208352 A1* | 7/2015 | Backholm | ......... | H04W 52/0251 455/574 |

OTHER PUBLICATIONS

Xing Xu et al., "Investigating Transparent Web Proxies in Cellular Networks", 16th International Conference, Passive and Active Measurement, 2015, p. 268 (Year: 2015).*

* cited by examiner

*Primary Examiner* — Clayton R Williams

(57) ABSTRACT

Described herein are systems, methods, and software to dynamically set a keepalive status for a client-server connection. In one implementation, a load balancer, providing load balancing operations for a plurality of servers, identifies a first FIN packet from a client to a server of the plurality of servers and sets a Transmission Control Protocol (TCP) keepalive status in association the connection between the client and the load balancer. The proxy further identifies a second FIN packet from the server to the client and removes the TCP keepalive status in association with the connection in response to the second FIN packet.

20 Claims, 5 Drawing Sheets

DYNAMICALLY MANAGING KEEPALIVE STATUS FOR CLIENT-SERVER CONNECTIONS

RELATED APPLICATIONS

Benefit is claimed under 35 U.S.C. 119(a)-(d) to Foreign Application Serial No. 202041042763 filed in India entitled "DYNAMICALLY MANAGING KEEPALIVE STATUS FOR CLIENT-SERVER CONNECTIONS", on Oct. 1, 2020, by VMware, Inc., which is herein incorporated in its entirety by reference for all purposes.

TECHNICAL BACKGROUND

In computing networks, load balancers may be used to direct requests from client computing nodes to servers in a pool of available servers. Load balancers are typically transmission control protocol (TCP) proxies that terminate the client TCP connection and initiate a connection towards the server in the pool. The load balancer maintains the association between the client and server connection. It is mostly used in conjunction with network address translation (NAT/PAT) and firewalls which are deployed at the Internet Service Provider (ISP) edge or data center (DC) edge. In some examples, when a connection request is received from a client, a NAT may translate the Internet Protocol (IP) address and port of the client into a Private/Public IP address and port. Once translated, and sent to the load balancer, the load balancer may select a server in the server pool to service the request and forward the request to the selected server.

However, while the services may provide load balancing to the servers in the computing network, difficulties can arise in managing the number of connections from the client devices. In particular, because a NAT/PAT translates the client address (IP and port) to a local/public address and local/public port (depending on where it is deployed), timeouts may be used to make the address/port available for a new connection. For example, a timeout may monitor for when a connection has been inactive for a set period of time. However, the length of time for a server to complete a requested task can vary based on the type of request. As a result, using an improper timeout may prematurely end a connection between a client and a server or permit a second client to be allocated the same address and port, causing errors in the connections.

SUMMARY

The technology described herein provides for dynamically managing keepalive status for client-server connections according to an implementation. In one example, a load balancer for a server pool may receive, from a client, a first FIN packet for a communication between the client and a server in the server pool and, in response to the first FIN packet, set a Transmission Control Protocol (TCP) keepalive status in association with TCP connection between the client and the load balancer to prevent timeouts associated with the TCP connection. The proxy load balancer further identifies a second FIN packet from the server and, in response to the second FIN packet from the server, removes the TCP keepalive status in association with the TCP connection to move to a TCP Time Wait/Close Wait status.

DETAILED DESCRIPTION

Figure 1:
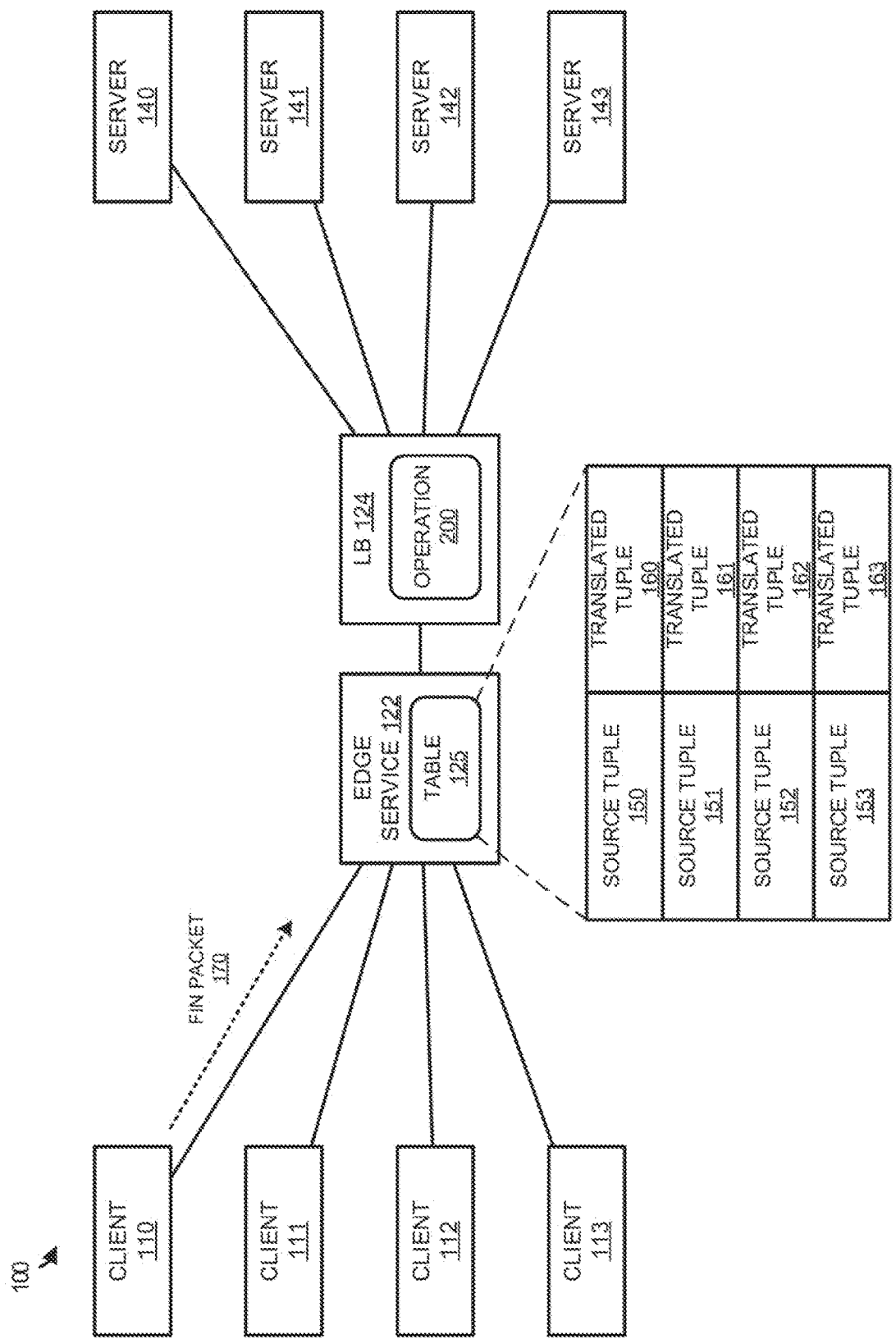
FIG. 1 illustrates a computing environment to manage keepalive status for client-server connections according to an implementation.

FIG. 1 illustrates a computing environment 100 to manage keepalive status for client-server connections according to an implementation. Computing environment 100 includes clients 110-113 and servers 140-143. Computing environment 100 further includes load balancer 124 and edge network (N/W) translation service 122, wherein edge N/W translation service 122 is representative of a service that provides network address translation and port address translation (NAT/PAT) and/or a firewall service. Edge N/W translation service 122 can be located in the Internet Service Provider (ISP) edge or the data center (DC) edge, translating IP addresses and ports for requesting clients and forwarding the requests to load balancer 124 that acts as a Transmission Control Protocol (TCP) proxy. Edge N/W translation service 122 maintains table 125 with tuples 150-153 and 160-163. Load balancer 124 distributes connection requests from clients 110-113 to servers 140-143 and implements operation 200 that is further described below in FIG. 2.

In operation, a client of clients 110-113 may initiate a TCP session with a virtual IP address hosted on load balancer 124. To initiate the session, a client may direct a request to edge N/W translation service 122, which maintains the translated tuple for the connection in table 125. In some implementations, a first tuple, or source tuple may include a source internet protocol (IP) address for the client, source port for the client, a destination address, and a destination port, wherein the destination address may comprise a virtual IP associated with the load balancer. For example, when client 110 initiates a request, a tuple associated with the request may be added to table 125, such as source tuple 150. Edge N/W translation service 122 may further perform address translation that translates the source IP address and port for the client to a local IP/Public IP address and port, wherein a new tuple 160 is created that includes the translated source IP address and port.

Once translated, the request is provided to load balancer 124 which provides a TCP proxy that selects a server for the request and forwards the request to the selected server. In some implementations, load balancer 124 provides load balancing across servers 140-143, wherein the destination for a request may be selected randomly, based on the load at each server 140-143, or based on some other factor. After forwarding the request, the client may communicate with the server through load balancer 124. In this manner, a first TCP session is established between the client and load balancer 124, while a second TCP session is established between load balancer 124 and the corresponding server.

In some implementations, edge N/W translation service 122 may remove entries in table 125 based on timeouts associated with the connections, wherein a connection may timeout when the connection is idle for a set period of time. This is more evident when the client has generated a FIN packet and is waiting for the load balancer 124 (dictated by the server behind it) to close the connection. Slow server processes can result in the connection being idle for a long period, which may result in edge N/W translation service 122 timing out the connection. Here, to limit improper timeouts and the removal of connections, load balancer 124 may monitor for a FIN packet from the client to the destination server. For example, client 110 may generate a FIN packet 170 that is forwarded by load balancer 124 to server 142. In response to identifying the FIN packet, load balancer 124 may set a TCP keepalive status associated with the TCP connection between client 110 and load balancer 124 through the edge N/W translation service 122. TCP keepalive is used to send probe packets to computing elements in a TCP connection to maintain the connection for the connected elements. Advantageously, by setting the TCP keepalive status for the connection, the entry in table 125 maintained by edge N/W translation service 122 may be preserved for a prolonged period to permit the server to complete the required operations.

After server 142 communicates a FIN packet or message back to load balancer 124, which can be forwarded to the client, load balancer 124 and may remove the TCP keepalive status associated with the connection and permit the entry in table 125 of edge N/W translation service 122 to timeout or, in the example where edge N/W translation service 122 can maintain state for a connection, place the connection in a TCP Time Wait/Close Wait status. In some examples, edge N/W translation service 122 also keeps track of TCP state and marks the entry for timeout. When timed-out, the port allocated to client 110 as part of the NAT/PAT operations, may be allocated to a new connecting client. For example, after the connection expires for client 110 and a first assigned port, client 111 may generate a request that is received by edge N/W translation service 122 and edge N/W translation service 122 may allocate the first assigned port to support the request.

Figure 2:
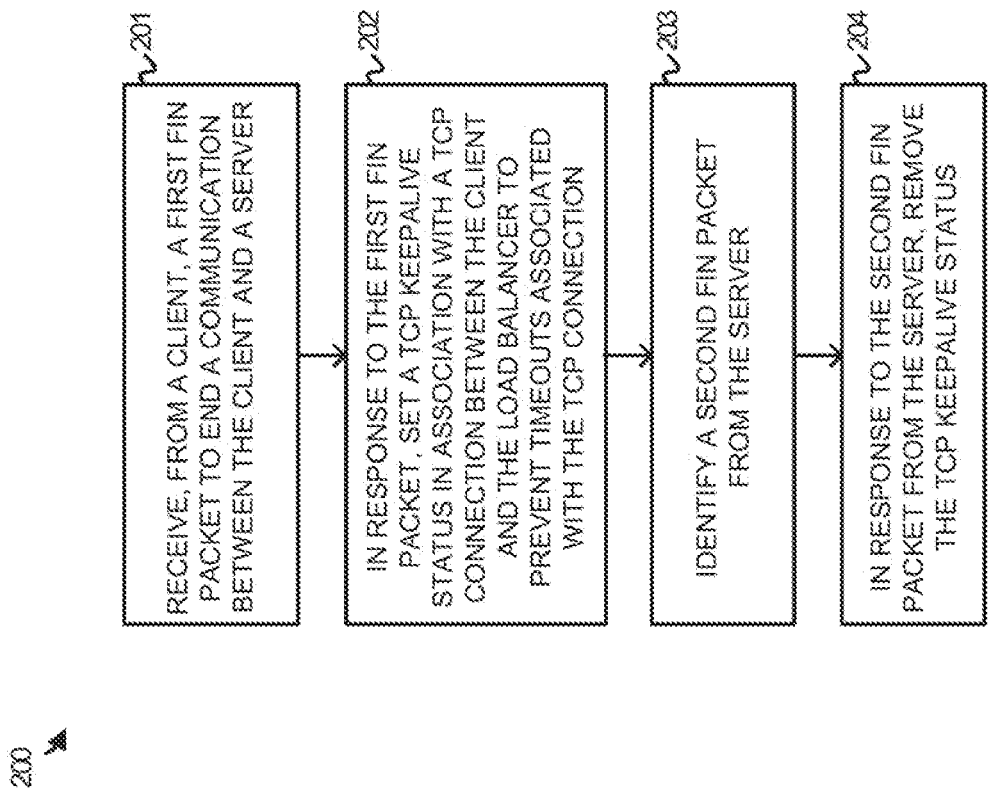
FIG. 2 illustrates an operation of a load balancer to manage keepalive status for client-server connections according to an implementation.

FIG. 2 illustrates an operation 200 of a load balancer to manage keepalive status for client-server connections according to an implementation. The steps of operation 200 are referenced parenthetically in the paragraphs that follow with reference to systems and elements of computing environment 100 in FIG. 1.

Operation 200 includes receiving (201), from a client, a first FIN packet to end a communication between the client and a server of a plurality of servers. As described herein, clients 110-113 may generate requests for communications with a server of servers 140-143. When a request is received by edge N/W translation service 122, edge N/W translation service 122 may perform NAT/PAT on the request to translate the source addressing from a first IP address and port to a second IP address and port. Additionally, load balancer 124, which acts as a TCP proxy, may select a server from servers 140-143 to support the request. The server may be selected randomly, may be selected based on the load at each of the servers, or may be selected based on some other factor. Once the server is selected, the request may be forwarded to the appropriate server by load balancer 124 and a communication can be established between the client and the server, where load balancer 124 acts as an intermediary for the connection. In some implementations, the communication may include a first TCP connection between the client to the proxy load balancer 124 and a second TCP connection between the load balancer and the destinations server.

After the communication path is established between the client and the server, the client may communicate a FIN packet which indicates that no further data is to be communicated from the client to the server. In response to the first FIN packet from the client, operation 200 sets (202) a TCP keepalive status in association with the TCP connection between the client and the load balancer. The TCP keepalive status is used to communicate probe packets to the elements in the connection to maintain the connection and prevent timeouts associated with the TCP connection. After setting the TCP keepalive status, operation 200 identifies (203) a second FIN packet from the server and, in response to the second FIN packet from the server, removes (204) the TCP keepalive status in association with the TCP connection, wherein removing the TCP keepalive status may trigger a TCP Time Wait/Close Wait status.

As an illustrative example of operation 200, client 110 may establish a communication with server 140 over edge N/W translation service 122 and load balancer 124. Once client 110 is done communicating data to server 140, client 110 may communicate a FIN packet over edge N/W translation service 122 and load balancer 124 to server 140. Load balancer 124 may acknowledge the receipt of the FIN packet back to the client and load balancer 124 may set a TCP keepalive status for the connection between client 110 and load balancer 124, wherein the keepalive status is used to maintain the connection using probe or non-data packets. In some implementations, the communication of the keepalive packets may occur at intervals based on previous keepalive statuses for connections in the computing environment. In some examples, load balancer 124 may monitor the rate port reuse or resets (RSTs) from edge N/W translation service 122 to dynamically modify and update a keepalive timer.

Once the first FIN packet is identified, the keepalive status is maintained until a notification is identified by load balancer 124 that the TCP connection can be closed or timed-out. In one implementation, load balancer 124 may monitor packets from server 140 to determine when a second FIN packet is communicated. When a second FIN packet is communicated, the keepalive status associated with the connection may be removed and the connection may be timed out at edge N/W translation service 122 due to inactivity over the TCP connection.

In some implementations, load balancer 124 may use other information to determine when to remove the TCP keepalive status. As an example, load balancer 124 may remove the keepalive status in response to receiving an RST or reset packet from edge N/W translation service 122 or a RST from the server. Once the keepalive status is removed, the connection may be timed out for the elements in the connection, permitting the NAT to assign the same port to another new connection.

Figure 3:
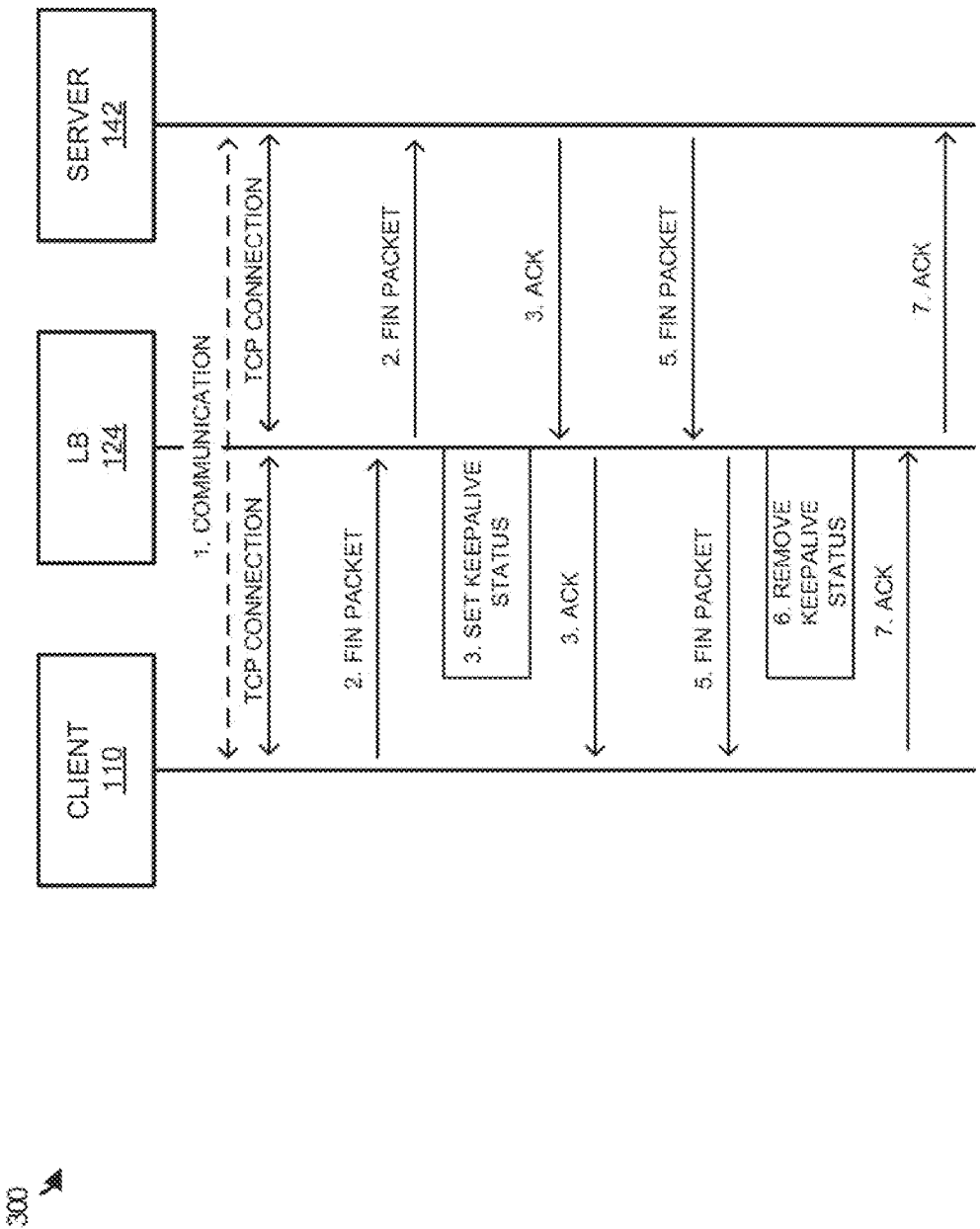
FIG. 3 illustrates a timing diagram of managing keepalive status for client-server connections according to an implementation.

FIG. 3 illustrates a timing diagram 300 of managing keepalive status for client-server connections according to an implementation. Timing diagram 300 includes client 110, load balancer 124, and server 142 from computing environment 100 of FIG. 1.

In operation, client 110 may establish, at step 1, a communication with server 142 using load balancer 124. In some implementations, to establish the connection client 110 may direct a request to load balancer 124, wherein load balancer 124 may provide load balancing operations to select a server from a pool of available servers. In some implementations, prior to providing the request to load balancer 124, the request may be communicated to an edge N/W translation service that can provide at least NAT/PAT translation for the request. Once translated, the packet may be forwarded to load balancer 124 for selection of a server in the pool of servers. The selected server may then be used to provide the required communications for the client, wherein the communication path may include a first TCP connection between the client and the load balancer and a second TCP connection between the load balancer and the selected server.

After initiating the communication with the server, client 110 may provide a FIN packet, at step 2, that is forwarded over load balancer 124 to server 142. Once the FIN packet is identified from client 110, load balancer 124 may set a keepalive status, at step 3, for the connection between client 110 and server 142. Server 142 may further communicate an acknowledgement packet or ACK packet to client 110 indicating that the FIN packet was received, at step 4. In some implementations, after receiving the FIN packet from client 110, server 142 may take a prolonged period to return a second FIN packet to gracefully close the connection or provide another data packet back to client 110. As a result, load balancer 124 may use the keepalive status to notify peers, via keepalive packets, to keep the connection open. This may include communicating non-data or probe packets to client 110, wherein the non-data packets may prevent the edge N/W translation service from reassigning the port for client 110 to another requesting client, may prevent client 110 from closing the connection, or may provide some other operation to keep the connection alive.

Once the keepalive status is set for the connection, load balancer 124 may monitor for and identify, at step 5, a FIN packet from server 142. In response to identifying the FIN packet from server 142, load balancer 124 may remove the keepalive status for the connection, at step 6, permitting the entry to timeout in the NAT/PAT table maintained by the edge N/W translation service. This timeout in the NAT/PAT table can permit a new requesting client to be allocated the IP address and port previously allocated to client 110. Once the FIN packet is received by client 110, client 110 may acknowledge the FIN packet, at step 7, by providing an acknowledgment packet back to server 142 over load balancer 124. In some examples, the ACK returned from client 110 may occur prior to the removal of the keepalive status.

In some implementations, other triggers may be used to determine that the connection is closed between the client and the server. For example, if a reset or RST packet were received by the load balancer, the load balancer may determine that the connection can timeout and the keepalive status is no longer required for the connection. Once the keepalive status is removed, the connection may timeout, permitting the edge N/W translation service to assign the port to other incoming requests.

Although demonstrated above as a client initiating a close of a communication with a FIN packet, it should be understood that similar operations may be performed when a server initiates a close to a communication. In some implementations, the load balancer may set a TCP keepalive status in a TCP connection with an edge N/W translation service, which can be an intermediary between the load balancer and the server, to prevent the timeout of the connection at the edge N/W translation service. Thus, even when the server initiates the close of the communication, the TCP connection over the edge N/W translation service may be preserved.

Figure 4:
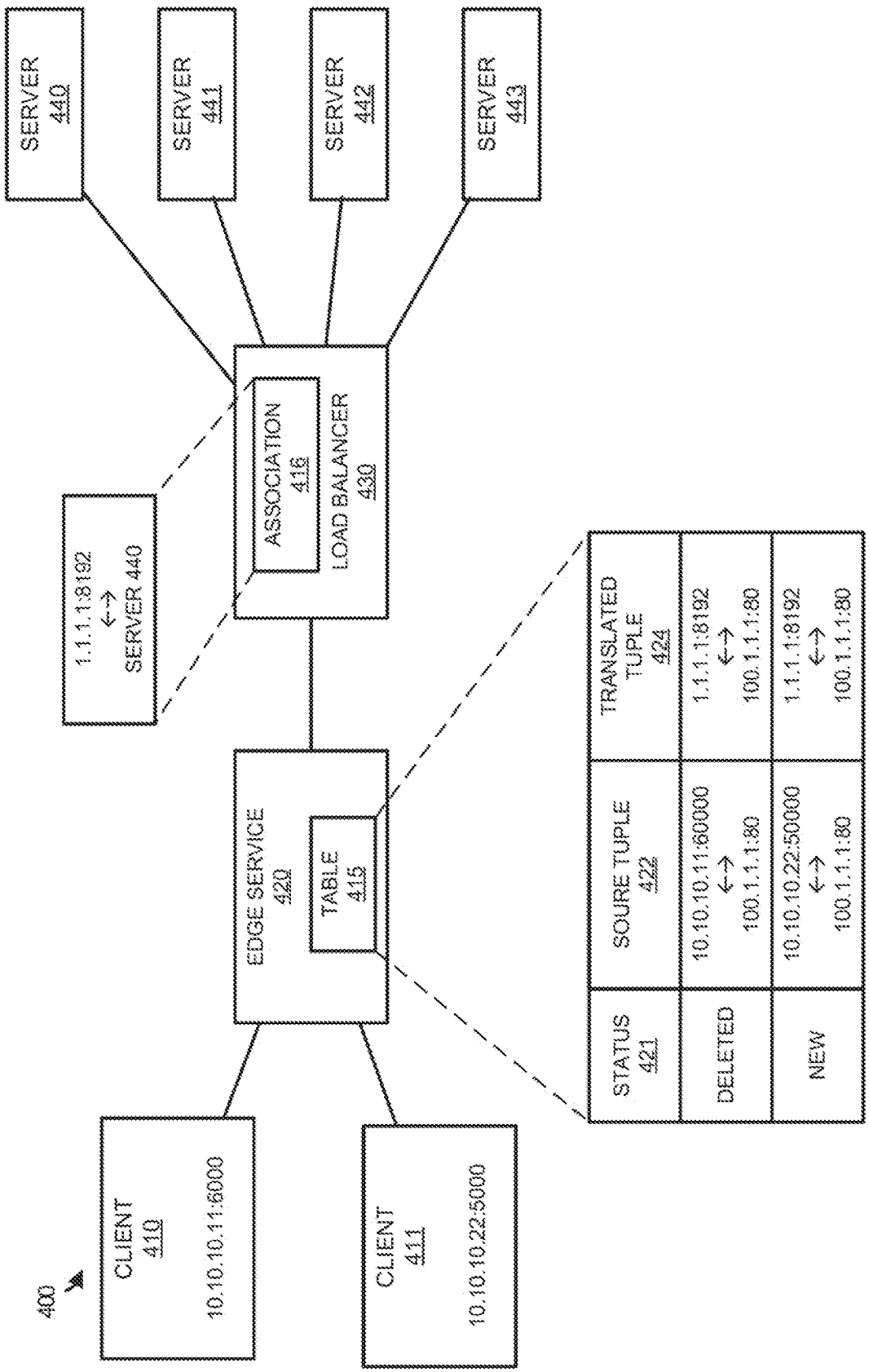
FIG. 4 illustrates an operational scenario of updating address translations for client-server connections according to an implementation.

FIG. 4 illustrates an operational scenario 400 of updating address translations for client-server connections according to an implementation. Operational scenario 400 includes clients 410-411, edge N/W translation service 420, load balancer 430, and servers 440-443. Edge N/W translation service 420 further includes table 415 that translates a source tuple 422 to a translated tuple 424, and further includes a status 421 associated with the tuple. Load balancer 430 further includes association 416 that is used to associate a source address and port with a destination server.

In operation, client 410 initiates a communication with a server of servers 440-443. In initiating the communication, a request is received by edge N/W translation service 420 and addressing associated with client 410 is translated to a new IP address and port prior to forwarding the request to load balancer 430. Load balancer 430 selects a server from servers 440-443 and forwards the request to the destination server. After initiating the communication, client 410 may communicate a FIN packet to the server indicating that no further data is to be communicated from client 410 to the server. In response to identifying the FIN packet, load balancer 430 may set TCP keepalive status in association with the TCP connection from load balancer 430 to client 410. Load balancer 430 may then identify a second FIN packet from the server to gracefully close the connection, which removes the TCP keepalive status and permits the connection to timeout at edge N/W translation service 420.

As depicted in operational scenario 400, the keepalive status associated with the connection between client 410 and load balancer 430 may be used to communicate non-data or probe packets to client 410, which in turn ensures that middle services, such as edge N/W translation service 420, maintain the TCP connection. After the keepalive is no longer necessary, when the FIN packet is received from the server, edge N/W translation service 420 is permitted to timeout the connection and remove the connection from table 415.

After removing the entry associated with client 410, client 411 may generate a communication request and edge N/W translation service 420 may allocate the same IP address and port number to the connection, which is demonstrated in table 415. Further, load balancer 430 may select the same server to support the request or may select a different server for the request based on a load balancing algorithm. Once selected the communication path is established between client 411 and server 440 (selected by load balancer 430), client 411 may exchange the required data with server 440.

Similar to the operations described above with respect to client 410, load balancer 430 may monitor for a FIN packet from client 411 to the destination server 440. When a FIN packet is identified, load balancer 430 may set a keepalive status associated with the connection between client 411 and server 440. The keepalive status may be used to communicate keepalive packets, such that the translation entry in edge N/W translation service 420 is not deleted prior to the connection terminating. Once a FIN packet is returned from server 440 and identified by load balancer 430, load balancer 430 may remove the keepalive status associated with the TCP connection between load balancer 430 and client 411, permitting edge N/W translation service 420 to timeout the entry in table 415 associated with the connection.

Figure 5:
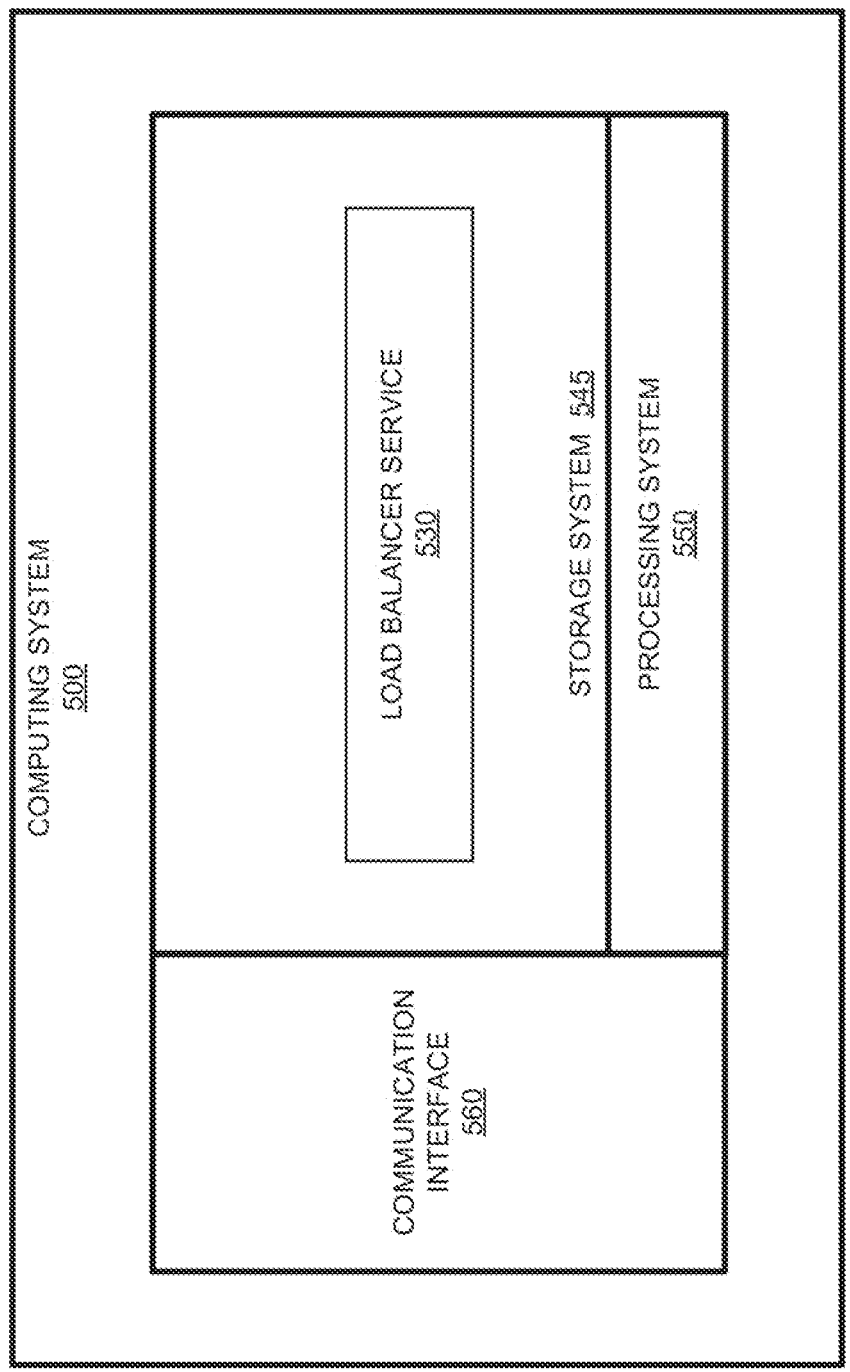
FIG. 5 illustrates a computing system to manage keepalive status for client-server connections according to an implementation.

FIG. 5 illustrates a computing system 500 to manage keepalive status for client-server connections according to an implementation. Computing system 500 is representative of any computing system or systems with which the various operational architectures, processes, scenarios, and sequences disclosed herein for a user interface service can be implemented. Computing system 500 is an example of load balancer 124 of FIG. 1 and load balancer 430 of FIG. 4, although other examples may exist. Computing system 500 includes storage system 545, processing system 550, and communication interface 560. Processing system 550 is operatively linked to communication interface 560 and storage system 545. Communication interface 560 may be communicatively linked to storage system 545 in some implementations. Computing system 500 may further include other components such as a battery and enclosure that are not shown for clarity.

Communication interface 560 comprises components that communicate over communication links, such as network cards, ports, radio frequency (RF), processing circuitry and software, or some other communication devices. Communication interface 560 may be configured to communicate over metallic, wireless, or optical links. Communication interface 560 may be configured to use Time Division Multiplex (TDM), Internet Protocol (IP), Ethernet, optical networking, wireless protocols, communication signaling, or some other communication format—including combinations thereof. Communication interface 560 may be configured to communicate with a plurality of servers that can provide resources to requesting clients. Communication interface 560 may further communicate with a NAT, firewall, or other service provides an intermediary between a client and the server.

Processing system 550 comprises microprocessor and other circuitry that retrieves and executes operating software from storage system 545. Storage system 545 may include volatile and nonvolatile, removable and non-removable media implemented in any method or technology for storage of information, such as computer readable instructions, data structures, program modules, or other data. Storage system 545 may be implemented as a single storage device but may also be implemented across multiple storage devices or sub-systems. Storage system 545 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 550 is typically mounted on a circuit board that may also hold the storage system. The operating software of storage system 545 comprises computer programs, firmware, or some other form of machine-readable program instructions. The operating software of storage system 545 comprises load balancer service 530 that can provide at least operation 200 of FIG. 2. The operating software on storage system 545 may further include an operating system, utilities, drivers, network interfaces, applications, or some other type of software. When read and executed by processing system 550 the operating software on storage system 545 directs computing system 500 to operate as described herein.

In at least one implementation, load balancer service 530 directs processing system 550 to act as a TCP proxy and select a server from a plurality of servers to support a communication request from a client. The server may be selected randomly, based on the load at each of the servers, or based on some other load balancing algorithm. Once the server is selected, the client and the server may complete the required handshakes to establish the communication. Once the communication is established, load balancing service 530 directs processing system 550 to receive, from the client, a first FIN packet to close the communication with the server. In particular, when the client has completed sending data to the server, the client may use a FIN packet to indicate that the client has completed sending data. In response to receiving the FIN packet, the server may respond with an acknowledgment packet indicating the receipt of the FIN packet. In response to receiving the first FIN packet, load balancing service 530 may direct processing system 550 to set a TCP keepalive status in association with the connection between the client and the load balancer. The TCP keepalive status is used to maintain the allocated ports and connections for the communication between the client and the and the load balancer to wait for a response from the server.

In some implementations, the TCP keepalive status may be used to maintain entries in an edge N/W translation service, wherein the edge N/W translation service translates an address and port of the client to an address and port available on the edge N/W translation service (e.g., public/private translation). As the TCP keepalive packets are communicated across the edge N/W translation service to the client, the edge N/W translation service may maintain the entry in the NAT/PAT table without timing out. Consequently, the private IP and port address will not be allocated to another requesting client, prior to the server closing the connection.

After setting the TCP keepalive for the connection between the client and the load balancer, load balancer service 530 directs processing system 550 to monitor for a return FIN packet from the server. In response to identifying the FIN packet, which can be used to close the communication with the client, load balancer service 530 will remove the keepalive status associated with the TCP connection from the client to the load balancer. By removing the status, the connection may be timed out at elements like the edge N/W translation service, permitting the port to be allocated to other requesting clients.

Although implemented on separate computing systems in some examples, it should be understood that the Edge N/W Translation Device (NAT/PAT, firewall, and other services) may be implemented on the same computing system as the load balancer.

Returning to the elements of claim 1, edge N/W translation service 122 and load balancer 124 may each comprise communication interfaces, network interfaces, processing systems, computer systems, microprocessors, storage systems, storage media, or some other processing devices or software systems, and can be distributed among multiple devices. Examples of edge N/W translation service and load balancer 124 can include software such as an operating system, logs, databases, utilities, drivers, natural language processing software, networking software, and other software stored on a computer-readable medium. Edge N/W translation service and load balancer 124 may comprise, in some examples, one or more server computing systems, desktop computing systems, laptop computing systems, or any other computing system, including combinations thereof.

Clients 110-113 may each comprise communication interfaces, network interfaces, processing systems, computer systems, microprocessors, storage systems, storage media, or some other processing devices or software systems. Clients 110-113 may comprise physical computing systems, such as desktop computers, laptop computers, tablets, smartphones, or some other physical computing system. Clients 110-113 may further represent virtual nodes (containers, virtual machines, or other containerized endpoints) executing on physical host computing systems.

Servers 140-143 may each comprise communication interfaces, network interfaces, processing systems, computer systems, microprocessors, storage systems, storage media, or some other processing devices or software systems, and can be distributed among multiple devices. Servers 140-143 can each include software such as an operating system, logs, databases, utilities, drivers, natural language processing software, networking software, and other software stored on a computer-readable medium. Servers 140-143 may comprise physical serving computing systems or may comprise virtual computing systems (containers, virtual machines, or other containerized endpoints) that execute on one or more host computing systems.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a load balancer, the method comprising:
   receiving, from a client, a first FIN packet to end a communication between the client and a server of a plurality of servers, wherein the load balancer provides a Transmission Control Protocol (TCP) proxy between the client and the server;
   in response to the first FIN packet, setting a TCP keepalive status in association with a TCP connection between the client and the load balancer to prevent timeouts associated with the TCP connection;
   identifying a second FIN packet from the server; and
   in response to the second FIN packet from the server, removing the TCP keepalive status in association with the TCP connection.

2. The method of claim 1 further comprising:
   identifying a keepalive timer for the TCP keepalive status based on the rate of port reuse or resets from an edge network translation service.

3. The method of claim 1 further comprising:
   receiving a request from the client for the communication with the server;
   selecting the server from the plurality of servers based on a load balancing algorithm; and
   forwarding the request to the server.

4. The method of claim 1, wherein the client comprises a physical computing system or a virtual node.

5. The method of claim 1, wherein the server comprises a physical computing system or a virtual node.

6. The method of claim 1 further comprising:
   exchanging one or more keepalive packets in association with the TCP keepalive status.

7. The method of claim 1 further comprising:
   forwarding the first FIN packet to the server;
   receiving an acknowledgment from the server for the first FIN packet; and
   forwarding the acknowledgement to the client.

8. A computing apparatus comprising:
   a storage system;
   a processing system operatively coupled to the storage system; and
   program instructions stored on the storage system to operate a load balancer that, when executed by the processing system direct the computing apparatus to:
   receive, from a client, a first FIN packet to end a communication between the client and a server of a plurality of servers, wherein the load balancer provides a Transmission Control Protocol (TCP) proxy between the client and the server;
   in response to the first FIN packet, set a TCP keepalive status in association with a TCP connection between the client and the load balancer to prevent timeouts associated with the TCP connection;
   identify a second FIN packet from the server; and
   in response to the second FIN packet from the server, remove the TCP keepalive status in association with the TCP connection.

9. The computing apparatus of claim 8, wherein the program instructions further direct the computing apparatus to:
   identify a keepalive timer for the TCP keepalive status based on the rate of port reuse or resets from an edge network translation service.

10. The computing apparatus of claim 8, wherein the program instructions further direct the computing apparatus to:
    receive a request from the client for the communication with the server;
    select the server from the plurality of servers based on a load balancing algorithm; and
    forward the request to the server.

11. The computing apparatus of claim 8, wherein the client comprises a physical computing system or virtual node.

12. The computing apparatus of claim 8, wherein the server comprises a physical computing system or virtual node.

13. The computing apparatus of claim 8, wherein the program instructions further direct the computing apparatus to:
    exchange one or more keepalive packets in association with the TCP keepalive status.

14. The computing apparatus of claim 8, wherein the program instructions further direct the computing apparatus to:
    forward the first FIN packet to the server;
    receive an acknowledgment from the server for the first FIN packet; and
    forward the acknowledgement to the client.

15. A system comprising:
    a plurality of servers; and
    a load balancer communicatively coupled to the plurality of servers and configured to:
    receive, from a client, a first FIN packet to end a communication between the client and a server of the plurality of servers, wherein the load balancer provides a Transmission Control Protocol (TCP) proxy between the client and the server;
    in response to the first FIN packet, set a TCP keepalive status in association with a TCP connection between the client and the load balancer to prevent timeouts associated with the TCP connection;
    identify a second FIN packet from the server; and
    in response to the second FIN packet from the server, remove the TCP keepalive status in association with the TCP connection.

16. The system of claim 15, wherein the load balancer is further configured to:
    identify an optimal keepalive timer for the TCP keepalive status based on the rate of port reuse or resets from an edge network translation service.

17. The system of claim 15, wherein the load balancer is further configured to:

receive a request from the client for the communication with the server;
select the server from the plurality of servers based on a load balancing algorithm; and
forward the request to the server.

18. The system of claim 15, wherein the client comprises a physical computing system or virtual node.

19. The system of claim 15, wherein the load balancer is further configured to:
exchange one or more keepalive packets in association with the TCP keepalive status.

20. The system of claim 15, wherein the load balancer is further configured to:
forward the first FIN packet to the server;
receive an acknowledgment from the server for the first FIN packet; and
forward the acknowledgement to the client.

\* \* \* \* \*